(12) United States Patent
Schneider

(10) Patent No.: US 6,416,093 B1
(45) Date of Patent: Jul. 9, 2002

(54) ENERGY ABSORPTION, ROTATION AND REDIRECTION SYSTEM FOR USE WITH RACING VEHICLES AND A SURROUNDING BARRIER

(76) Inventor: Phillip Schneider, 5066 N. Gale Rd., Davison, MI (US) 48423

( * ) Notice: Subject to any disclaimer, the term of this patent is extended or adjusted under 35 U.S.C. 154(b) by 0 days.

(21) Appl. No.: 09/878,478

(22) Filed: Jun. 11, 2001

(51) Int. Cl.⁷ .............................................. B60R 19/20
(52) U.S. Cl. ..................... 293/107; 293/110; 293/118; 280/735; 342/70; 342/436; 180/169
(58) Field of Search ................. 293/107, 134, 293/110, 118, 180.1; 280/735, 229; 404/6, 70; 342/126, 128, 961; 180/169, 903; 340/436.1

(56) References Cited

U.S. PATENT DOCUMENTS

| | | | | |
|---|---|---|---|---|
| 3,735,398 A | * | 5/1973 | Ross .......................... 280/735 |
| 3,938,840 A | * | 2/1976 | Haase et al. ................. 293/110 |
| 4,399,887 A | * | 8/1983 | Okada ........................ 280/735 |
| 4,518,183 A | * | 5/1985 | Lee ............................. 293/118 |
| 4,673,937 A | * | 6/1987 | Davis .......................... 342/128 |
| 4,926,171 A | * | 5/1990 | Kelley ......................... 340/961 |
| 5,004,394 A | * | 4/1991 | Goodwin et al. ........... 293/134 |
| 5,122,796 A | * | 6/1992 | Beggs et al. ................ 180/169 |
| 5,192,838 A | | 3/1993 | Breed et al. .......... 200/61.45 R |
| 5,307,896 A | * | 5/1994 | Taguchi et al. ............. 280/735 |
| 5,314,037 A | * | 5/1994 | Shaw et al. ................. 180/169 |
| 5,338,061 A | | 8/1994 | Nelson et al. .............. 280/729 |
| 5,392,024 A | * | 2/1995 | Kiuchi et al. ............... 280/735 |
| 5,403,113 A | | 4/1995 | Gertz et al. ..................... 404/6 |
| 5,431,463 A | * | 7/1995 | Chou .......................... 293/110 |
| 5,467,072 A | * | 11/1995 | Michael ...................... 340/436 |
| 5,471,214 A | * | 11/1995 | Faibish et al. ................. 342/70 |
| 5,489,117 A | | 2/1996 | Huber ......................... 280/738 |
| 5,517,197 A | * | 5/1996 | Algeo et al. .................. 342/70 |
| 5,645,368 A | | 7/1997 | Yunick ........................... 404/6 |
| 5,646,613 A | * | 7/1997 | Cho ............................ 180/169 |
| 5,691,725 A | * | 11/1997 | Tanaka ....................... 342/126 |
| 5,860,762 A | | 1/1999 | Nelson .......................... 404/6 |
| 5,921,702 A | | 7/1999 | Fitch ............................. 404/6 |
| 5,957,616 A | | 9/1999 | Fitch ............................. 404/6 |
| 5,959,552 A | * | 9/1999 | Cho ............................ 340/903 |
| 6,010,275 A | * | 1/2000 | Fitch ............................. 404/6 |
| 6,085,151 A | * | 7/2000 | Farmer et al. ................. 342/70 |
| 6,106,038 A | * | 8/2000 | Dreher ........................ 293/107 |
| 6,173,943 B1 | | 1/2001 | Welch et al. .............. 256/13.1 |
| 6,209,909 B1 | * | 4/2001 | Breed .......................... 280/735 |
| 6,213,496 B1 | * | 4/2001 | Minami et al. ............. 280/729 |
| 6,343,810 B1 | * | 2/2002 | Breed .......................... 280/735 |
| 2002/0027339 A1 | * | 3/2002 | Breed .......................... 280/735 |

* cited by examiner

Primary Examiner—Ken Patel
(74) Attorney, Agent, or Firm—Gifford, Krass, Groh, Sprinkle, Anderson & Citkowski, P.C.

(57) ABSTRACT

An energy absorption, rotation and redirection system for use with a vehicle traveling astride a barrier, the vehicle including a front end with a bumper and first and second sides. The system includes a plurality of air bag actuating units mounted at specified locations along the front end and first and second sides of the vehicle. Preferably three air bag units are located at spaced intervals along the front bumper of the vehicle, with individual and additional air bags being located on the sides of the vehicle. An activator mechanism is associated with one or more of the actuating units for selectively instructing the inflation of an exterior air bag associated with the given bag actuating unit. The activator mechanism includes a reflective target strip applied along the barrier, as well as laser emitter/receptor units associated with each of the air bag actuating units. A computerized processor and memory chip is located in the vehicle and instructs the issuance of a lasing pattern from each of the emitter/receptor units. Upon at least one of the emitter/receptor units receiving a reflection from the target strip, indicative of a given orientation of the vehicle relative to the concrete wall barrier, the activator mechanism directs deployment of the external air bags and prior to the vehicle striking the barrier. The vehicle subsequently rotates and redirects about the barrier concurrent with the barrier absorbing a determined percentage of force associated with the contact.

17 Claims, 5 Drawing Sheets

ENERGY ABSORPTION, ROTATION AND REDIRECTION SYSTEM FOR USE WITH RACING VEHICLES AND A SURROUNDING BARRIER

BACKGROUND OF THE INVENTION

1. Field of the Invention

The present invention relates generally to vehicle restraint and impact/collision assemblies for protecting the both the vehicle operator and others. More particularly, the present invention discloses an energy absorption, rotation and redirection system for particular use with racing vehicles within a confining and surrounding barrier and which functions to absorb a minimal degree of impact force attendant with the racing vehicle impacting the wall at a given angle of contact, concurrent with exteriorly actuated air bag systems of the vehicle interacting with the wall to rotate and redirect the remaining force so as to keep the vehicle moving in its generally forward direction along with the other vehicles on the track.

2. Description of the Prior Art

Various systems and assemblies are known in the art for sensing and, to some extent, responding to vehicle impacts or collisions. The purpose, in every such instance, is to attempt to avoid or minimize injury to the vehicle occupants as well as to the vehicle itself.

U.S. Pat. No. 6,085,151, issued to Farmer et al., teaches a predictive collision sensing system in which a relatively narrow beam of either a radio frequency (RF) or optical electromagnetic radiation is scanned over a relatively wide azimuthal range. A return signal is processed to detect a range and velocity of each point of reflection. Individual targets are then identified by clustering analysis and are tracked in a Cartesian coordinate system. The threat posed to the vehicle for a given target is assessed from estimates of its relative distance, velocity, and size. In response, one or more vehicular devices (air bags, seat belt pretensioners and deployable knee bolsters) are controlled in response to the assessment of threat so as to enhance the safety of the vehicle occupant.

U.S. Pat. No. 5,957,616, issued to Fitch, discloses a sacrificial (frangible) and inertial impact attenuating barrier which includes a thin walled plastic tub containing an energy absorbing and dispersible mass, such as water or sand. The tub is supported on a thin-walled plastic ring which elevates the dispersible mass to a height at which its center of gravity is the same as that of a particular racing vehicle, such as a Formula I car or the like.

U.S. Pat. No. 5,192,838, issued to Breed et al., discloses frontal impact crush zone crash sensors for determining sufficient impact force to trigger an air bag passenger restraint system. The sensors are intertially damped, with a dampening force calculated to be proportional to the square to velocity. The sensors are constructed of plastic and in the shape of short round or rectangular cylinders. The particular shape of the sensors minimizes the chance that they will be rotated during a crash and the sensors are further disclosed as installed on the frontal radiator structure or at such similar locations near the front of the vehicle. A typical crash sensor further includes a hinged plastic mass attached to the housing, the mass activating a contact assembly after a predetermined movement of the mass, and with a gap existing between the movable mass and interior wall of the housing to enhance damping of the crash sensor.

U.S. Pat. No. 5,489,117, issued to Huber, teaches an occupant restraint system incorporating a cushioning structure or air bag having an impermeable external wall and a permeable internal wall with gas passageways therebetween. The air bag is mounted on a pair of gas manifolds having manifold gas ports communicating with the gas passageways in the air bag. Gas generator units are secured to the manifolds and are actuable through impact signals to create high pressure gas directed through generator nozzles into the manifolds and subsequently into gas passageways of the air bag. A valve plate supports a plurality of inlet reed valves operating in conjunction with a corresponding plurality of inlet ports to admit ambient air from within the vehicle into the expanding air bag. A pair of bi-level exhaust valves permit the escape of high pressure gas and air from within the air bag into the vehicle interior upon completion of the deployment of the air bag. The exhaust valves restrict the rate of exit of the gas and air from within the air bag when an increase in the internal air bag pressure occurs such as caused by occupant impact.

Finally, U.S. Pat. No. 5,338,061, issued to Nelson et al., teaches another variation of air bag having double walled construction. The air bag is fitted to the housing of a gas generator and a gas jet opening allows the air bag to communicate with the housing. A gas generated by the gas generator, due to an impact, is charged into the air bag. The double wall construction of the air bag is such that a secondary outer bag has a greater volume or holding capacity than an initial and interiorly housed bag. The first air bag constitutes an air storage chamber which receives air from the atmosphere through an air intake path and stores the air. A gas storage chamber is formed between the first and second air bags and receives a combustion gas from the gas jet opening and temporarily stores the combustion gas. The air intake path is further typically a hollow path between the atmosphere and the air storage chamber and the first air bag has an opening therein which establishes communication between the gas storage chamber and the air storage chamber.

SUMMARY OF THE PRESENT INVENTION

The present invention is an energy absorption, rotation and redirection system for particular use with vehicles, and in particular racing vehicles within a confining and surrounding barrier. The system functions to absorb a minimal degree of impact force attendant with the racing vehicle impacting the wall at a given angle of contact, concurrent with exteriorly actuated air bag systems of the vehicle interacting with the wall to rotate and redirect the remaining force so as to keep the vehicle moving in its generally forward direction along with the other vehicles on the track.

The present invention is further an improvement over previous, and largely unsuccessful, attempts in the art to redesign the surrounding barriers to absorb impact forces associated with the vehicle, it being understood that any significant amount of impact force or trauma will prove dangerous or fatal to the vehicle operator (as well as spectators or participants located beyond deflectable barriers). It has further been determined, through investigation, that the human body cannot absorb momentum forces associated with high speed impacts, particularly those in excess of 180 mph in racing conditions.

Rather, the present invention operates under the theory that, it being impractical to attempt to substantially absorb forces resulting from impact collisions with the surrounding barrier, it is preferable to attempt to only absorb a minimal percentage of the impact forces concurrent with converting a majority of the impact forces in a rotating and redirecting manner about the barrier. It is a principal of physics that circular motion, unless reinforced, naturally dissipates energy and it is therefore desirous to employ this concept to assist in preventing injury and death to the vehicle occupants and which would otherwise tend to occur in instances where massive impact forces are redirected from the vehicle to wall collision and to the individual.

Accordingly, the present invention includes the provision of a plurality of air bag actuating units located along the front and sides of each vehicle within which the system is installed. In the preferred embodiment, a plurality of three bag actuating units are installed within the area of the front bumper of the vehicle and one additional actuating unit is located in the vehicle door associated with each of the driver and passenger sides. The actuating units are preferably in the form of insertable and replaceable cartridges which recess within the vehicle body and which, in certain instances, may be quickly replaced by the racer's pit crew.

An activator mechanism is provided for actuation/deploying the externally engageable air bags and includes an on-board processor and memory chip arrangement which communicates with each of the five individual air bag actuating units. Each air bag unit further includes a laser emitter/receptor which is instructed by the processor to issue a lasing pattern having a specified width and direction.

A further component of the activator mechanism contemplates the provision of a reflective and elongated target strip applied along the opposing facing and boundary surface of the barrier (typically a substantially vertically extending and concrete wall). Upon appropriate positioning of the vehicle relative to the concrete wall, such as occurring during a skid and during which the vehicle closes distance with the wall/barrier, at least one of the emitter/receptor units receives a return signal resulting from reflection from the target strip. At this point, the on-board processor and memory chip analyzes the parameters communicated by the associated actuating unit and, upon determining a closing speed and direction, determines the inevitability of contact and instructs the units to each deploy the external air bags before contact.

The configuration and arrangement of the air bags is further such that, upon such contact occurring at angles excepting a substantially perpendicular impact, the force of the vehicle is redirected in a rotating fashion, concurrent with a minority of the force being absorbed between the external bags and wall. In the rare instance in which the vehicle impacts the wall in substantially direct (non-angular) fashion, and in which the system is unable to rotate, the result is a three-stage cushioning of the impact force resulting from the successive impact and collapse of the central, larger and forwardly mounted external air bag, the subsequent impact and collapse of the two forwardly mounted and peripheral bags, and the contact of the vehicle's bumper with the wall.

Additional advantages of the system of the present invention include the application of a substantially frictionless surface coating upon the opposingly facing barrier surface, such possibly including an adhering nylon, epoxy or other suitable material which is resistant to scraping or shearing and which will contribute to sliding and rotational redirection of the impacting vehicle and without the generation or transference of any substantially inertial forces to the vehicle operators. The system of the present invention is also substantially effectively regardless of whether the vehicle rights itself after contacting the wall or continues in a rotational/reversing manner.

Yet additional advantages provided by the system of the present invention is the configuration of the external air bags with a suitable three dimensional shape and size (typically spheroid related) which will not substantially impair the vehicle operator's field of vision. To further enhance the durability and effectiveness of the bags, they are typically constructed of a heavy duty nylon material and may further be provided with concentric inner and outer layers which take into account the potential of the outer layer being punctured by sharp metal edges or the like and prior to the bags substantially fulfilling their function. Additionally, a gas (carbon dioxide) charge may be activated by the driver to quickly deflate the externally deployed bags in given situations (such as where only a minor rotating and redirecting impact has occurred) and where the driver desires to continue the race.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 6:
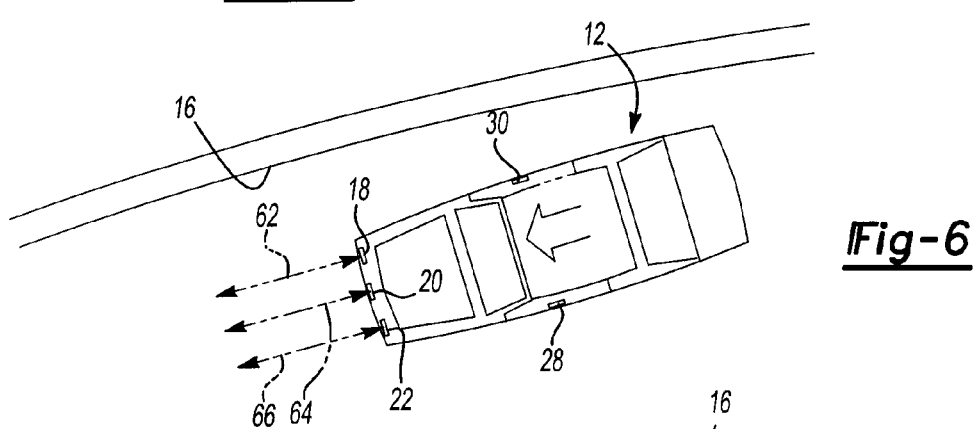
FIG. 6 is a top view of a selected vehicle traveling in a substantially straight, parallel and spaced manner relative the barrier.

Referring now to FIG. 6, an operative view is illustrated at 10 of an energy absorption, rotation and redirection system for particular use with vehicles, and in particular racing vehicles 12 and 14 within a confining and surrounding barrier 16. As stated previously, the system 10 functions to absorb a minimal degree of impact force attendant with the racing vehicle impacting the wall at a given angle of contact, concurrent with influencing the vehicle to rotate and redirect the remaining force so as to keep the vehicle moving in its generally forward direction along with the other vehicles on the track.

Figure 1:
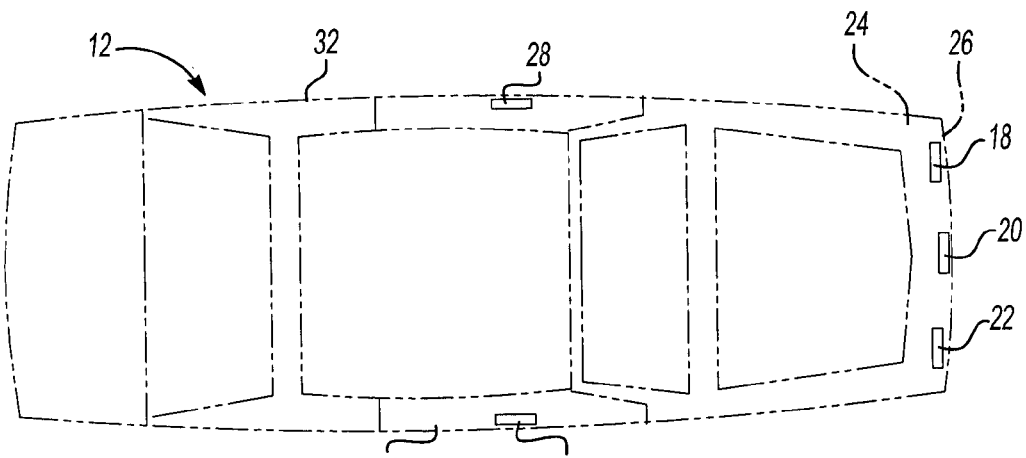
FIG. 1 is a top plan view of a vehicle in phantom and illustrating the preferred arrangement of the insertable and recessed cartridges, defining the air bag actuating units, and incorporating the exteriorly actuable air bags and sensing/triggering mechanism according to the present invention.
Figure 2:
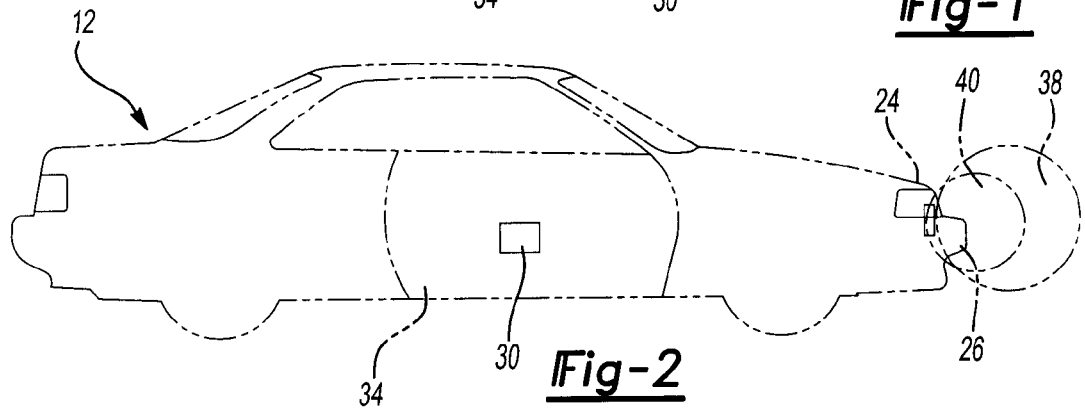
FIG. 2 is a rotated and side plan view of the vehicle, again in phantom, and illustrating the actuation of three front end mounted air bags according to the preferred embodiment of the present invention.
Figure 3:
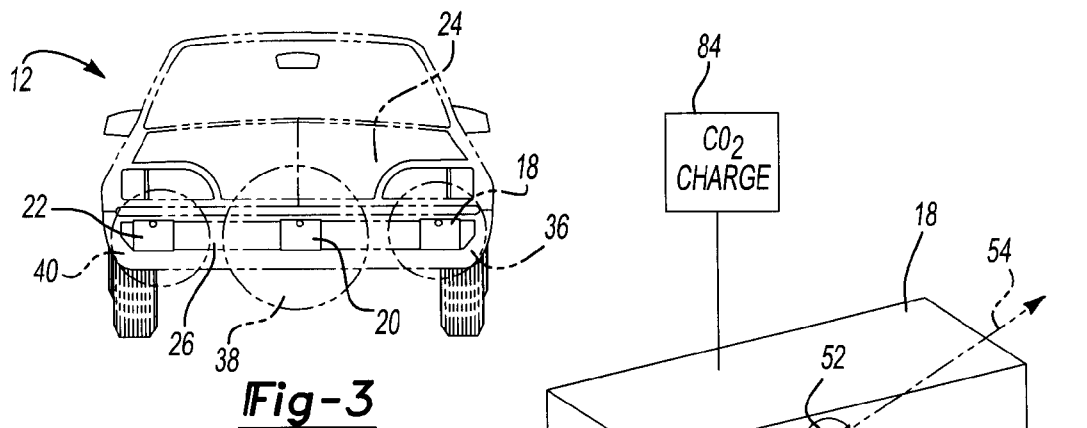
FIG. 3 is a rotated front plan view of the vehicle shown in FIG. 2 and illustrating, from a further the arrangement and configuration of the front end air bag assemblies.

Referring to FIGS. 1, 2 and 3, successive top side and front plan views are illustrated of the first selected vehicle 12 illustrated in phantom and incorporating components of the system of the present invention. In particular, a plurality of air bag actuating units are provided along the front and sides of the vehicle and, in the preferred embodiment, includes a plurality of first 18, second 20 and third 22 such actuating units located at spaced intervals along front end 24 of the vehicle 12 and in recessed fashion within a bumper 26 associated with the front end 24. Additional (fifth and sixth) air bag actuating units 28 and 30 are located in associating manner with driver and passenger sides of the vehicle and, in particular, are recess mounted within the driver 32 and passenger 34 doors.

The actuating units, when triggered as will be subsequently described, each deploy an external air bag. Referring to the side and front plan views of FIGS. 2 and 3, the air bags 36, 38 and 40 are illustrated in phantom associated with the front end first 18, second 20 and third 22 actuating units. As is also illustrated in FIGS. 1–3, the bags 36, 38 and 40 are each constructed with a specified spheroidal shape and size to both permit the driver substantially unimpeded view as well as to influence rotational and redirecting motion of the vehicle 12 upon striking the barrier 16 (due to the larger sizing of the middle or central second bag 38). Additional explanation and description of externally actuating bags 42 and 44 associated with the side mounted units 28 and 30 will be had with a further description of FIGS. 9–13 in succession, it being understood that the front and side bags are arranged in front of center location of the vehicle and with a given size to function, in cooperation with each other, to substantially rotate and redirect the vehicle 12 following all but substantially head on impacts with the surrounding barrier 16 and in the attempt to prevent the driver (not shown) from absorbing any significant trauma force resulting from such impact.

Figure 4:
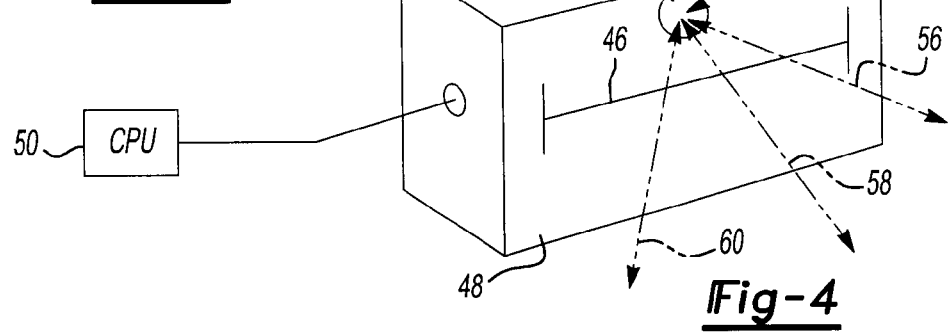
FIG. 4 is a sectional view, in perspective, of a selected air bag actuating unit according to the present invention.

Referring to FIG. 4, a sectional representation is shown of a selected air bag actuation unit, such as by example first actuating unit 18, it being understood that the identical description applies to each front and side unit 18, 20, 22, 28 and 30. The actuation units are each further constructed, in a preferred embodiment, of an insertable and replaceable cartridge unit which is capable of being quickly inserted and removed from the vehicle 12, such as by a member of the driver's pit crew. As is further illustrated in FIG. 4, each individual actuating unit 18 is further constructed of a specified three dimensional shape and size, such as rectangular although not limited to any specific shape and/or size, and includes a scored, slitted or perforated configuration 46 defined within a specified facing surface 48 of the selected unit 18.

In order to deploy the external air bags 18, 20, 22 42 and 44, an activator mechanism is incorporated into the system 10 and includes an on-board mounted computer processor 50 (CPU) with built-in memory chip. The processor 50 operatively communicates with each of the bag actuating units (again represented in FIG. 4 by first unit 18) and in particular with a laser emitter/receptor 52 arranged at a selected location along the unit 18 (such as again within the facing surface 48. It is also understood that the technology surrounding emitting and reception of laser generated signals is known within the technical art and also that the appropriate emitter and receptor units can be combined, separated and/or located either as a part of the associated actuating units or separated from the units and located at alternate positions in and around the vehicle.

In the preferred embodiment, the emitter/receptor unit (again at 52 for first unit 18) is instructed by the processor/memory chip 50 is issue a lasing pattern of specified range (and illustrated by directional arrows 54, 56, 58 and 60 in FIG. 4). Referring again to the applicational view of FIG. 6, individual laser patterns 62, 64 and 66 are illustrated (the pattern 62 corresponding to the directional arrows 54, 56, 58 and 60 in FIG. 4 of the first unit 18) and which are generated in the preferred embodiment by each of the forwardly directed actuating units 18, 20 and 22.

Figure 5:
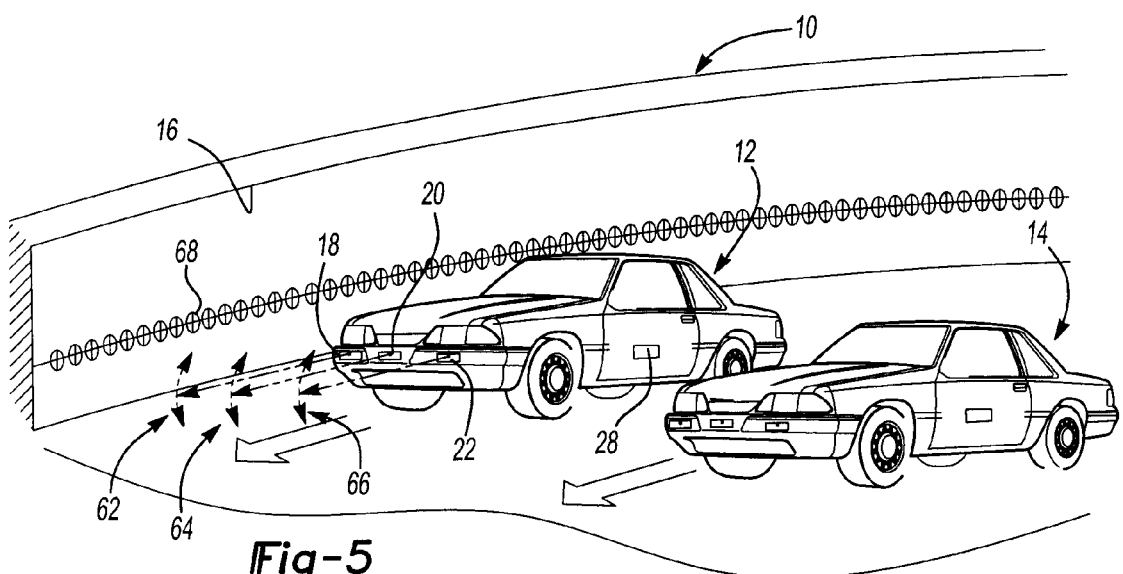
FIG. 5 is an environmental view and illustrating a pair of racing vehicles and a target strip applied in extending fashion along an inner face of a surrounding barrier according to the present invention.

In a preferred embodiment, the patterns 62, 64 and 66 exhibit a limited two dimensional and vertical range (as determined along its longitudinal traveling distance). Referring further to FIG. 6, the selected vehicle 12 is illustrated in a substantially straightened and astride traveling direction relative to the barrier surface 16 and so that the lasing patterns 62, 64 and 66 are illustrated in overhead and straight extending fashion. Referring again to FIG. 5, the barrier surface 16 includes a highly reflective and extending target strip 68 extending around portions or all of the barrier surface and at a given height (such as grill height) relative to each of the vehicles 12 and 14 traveling along the track.

Figure 7:
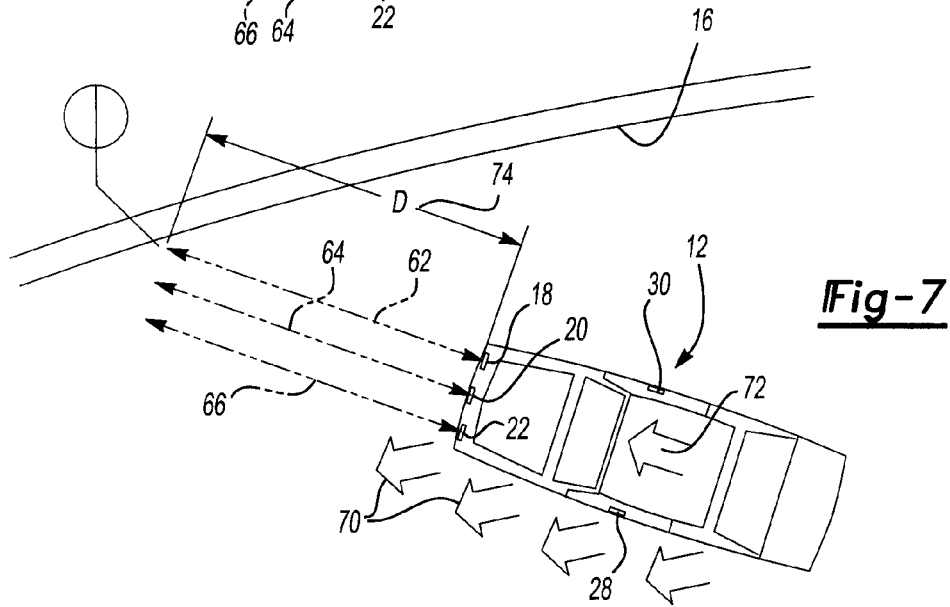
FIG. 7 is a view similar to that shown in FIG. 6 and further illustrating the racing vehicle initiating a skid relative to the barrier, concurrent with the sensors associated with the air bag actuating units first communicating with selected portions of the barrier target strip according to the present invention.

Referring to FIG. 7, the selected vehicle 12 is initiating a skidding or turning maneuver in a direction towards the barrier wall 16 (either as a result of contact with another racing vehicle 14 or due to the driver misjudging speed and road conditions). At this point, the vehicle direction alters from straightaway (illustrated at 70) to a specified turned direction 72 in which the lasing patterns 62, 64 and 66 are now directed towards the barrier surface 16 and at a specified distance D 74.

The forward air bag actuating units 18, 20 and 22 (in addition to the side units 28 and 30) are recessed mounted within the vehicle 12 and so that the lasing patterns 62, 64 and 66 issued by the emitter/receptors are only reflected off of the target strip 68 upon the vehicle angularly orienting in a given manner relative to the barrier 16. At this point, one or more of the lasing patterns 62, 64 and 66 are reflected off of the target strip 68 and in return fashion to the associated emitter/reflector (see again 52 in FIG. 4). At this point, the processor/memory chip 50 analyzes the speed, distance and orientation of the vehicle 12 relative to the barrier 16 and to determine if a wall impact is inevitable and if so, when it is desirable to deploy the exterior bags.

Figure 8:
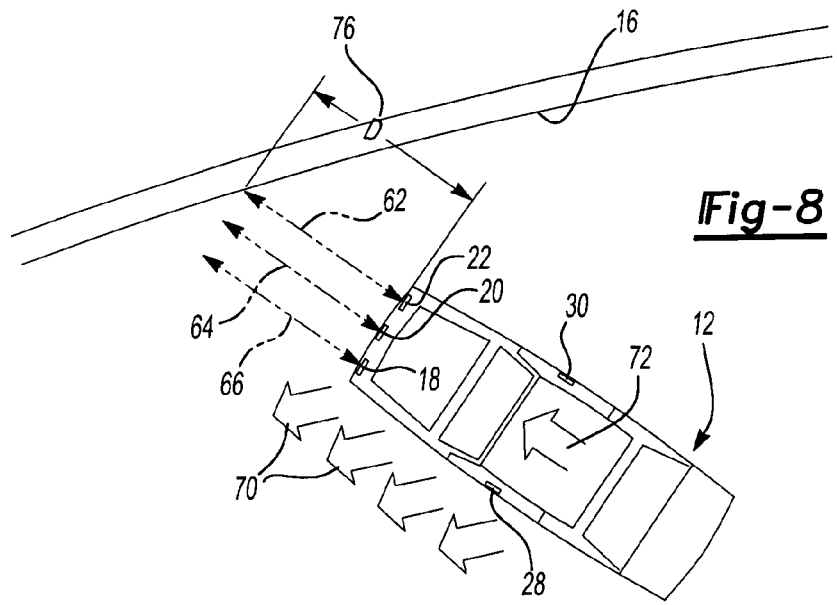
FIG. 8 is a further skidding and rotational view of the racing vehicle, at a further angular orientation and reduced distance relative to the barrier and which represents a triggering angle/distance at which the actuating of the air bag units is initiated.

Referring further to FIG. 8, the vehicle 12 is illustrated continuing on in a skidding and uneven traveling direction (see again arrow 72 relative to straight away directional arrows 70) and at a closing distance D 76. At this point, the processor/memory chip 50 determines that the proper speed, distance and orientation parameters of the vehicle 12 have been met and a deployment/engagement signal is simultaneously issued to all five of the air bag actuation units 18, 20, 22, 28 and 30.

Figure 9:
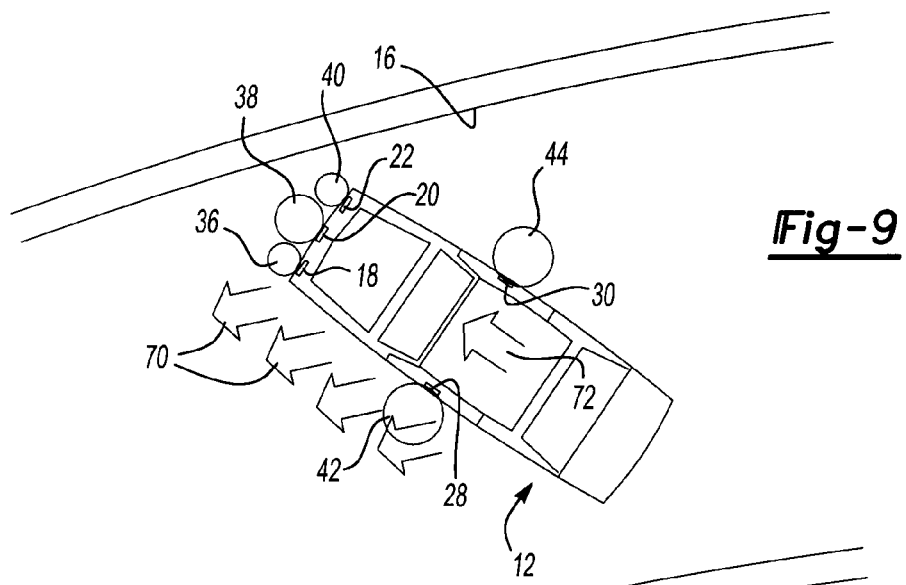
FIG. 9 is a yet further view of the skidding and/or rotating vehicle and which illustrates the air bag units in a fully actuated condition.
Figure 10:
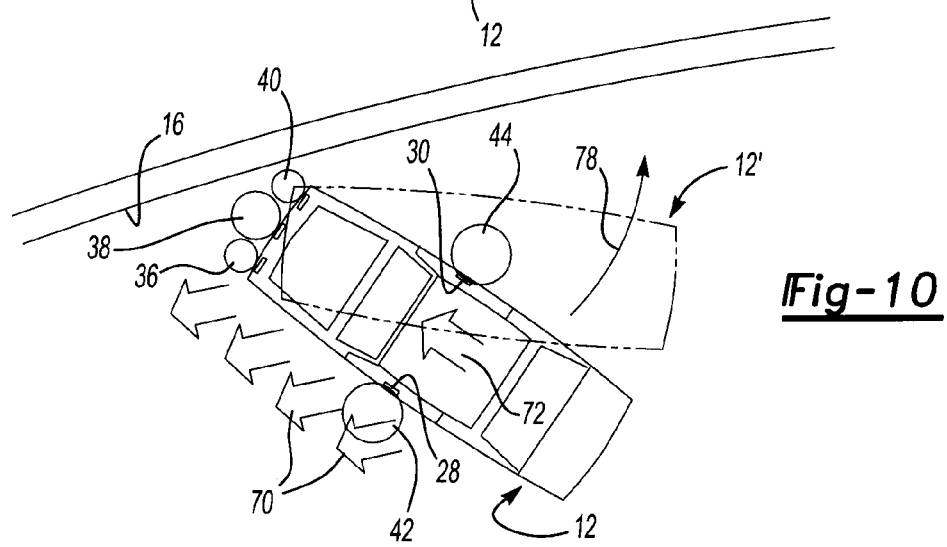
FIG. 10 is a progressive view of the illustrations collectively shown in FIGS. 6–9 and further illustrating a first possible outcome following impact of the vehicle with the barrier and in which the vehicle is influenced in a returned and substantially righted direction as also shown in FIG. 5.

Referring to FIG. 9, the vehicle 12 is illustrated in a pre-impacting position in which each of the external air bags are now fully engaged/deployed and prior to the vehicle, traveling in substantially the same manner and direction as previously described in FIGS. 7 and 8, impacting the wall barrier 16. Referring further to FIG. 10, the vehicle 12 has now impacted the wall 16 and, in one eventuality, begins to rotate and redirect (as indicated by arrow 78) in a righting direction and in which the vehicle 12 will resume a substantially righted and forward traveling direction illustrated by phantom designation 12'.

Figure 11:
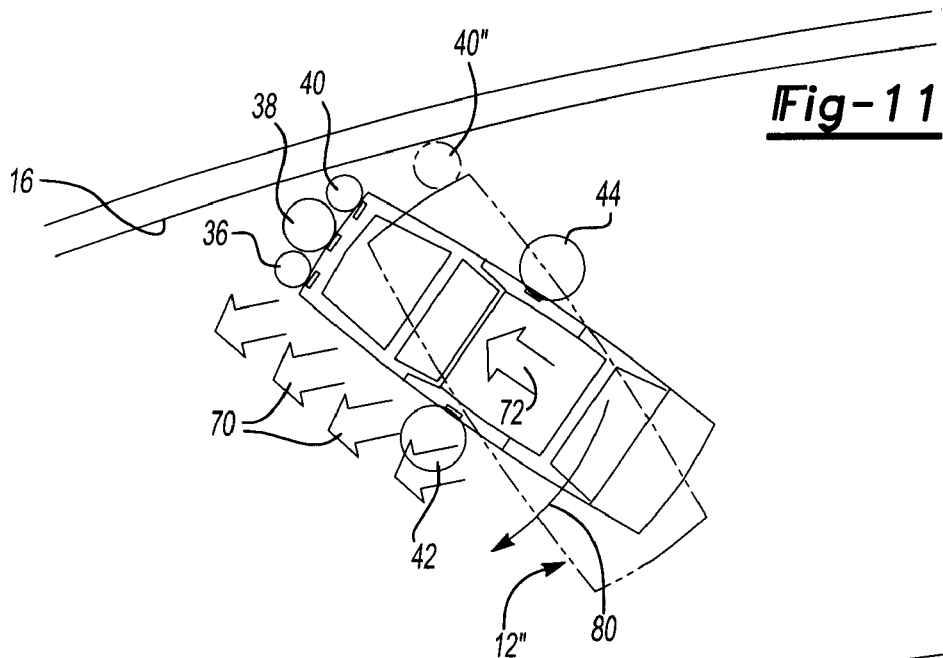
FIG. 11 is a progressive view of the illustrations collectively shown in FIGS. 6–9 and further illustrating a second possible outcome following impact of the vehicle with the barrier and in which the vehicle continues in its previous rotational motion and towards an opposite facing direction.
Figure 12:
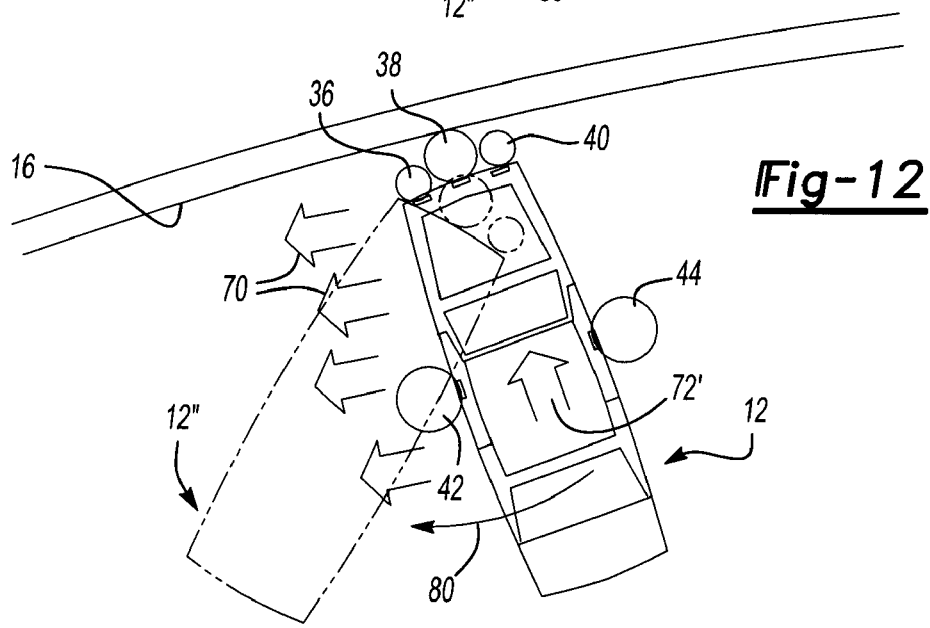
FIG. 12 is a yet further view illustrating the vehicle previously identified in FIG. 11 and continuing along a reversing rotated and redirected path.
Figure 13:
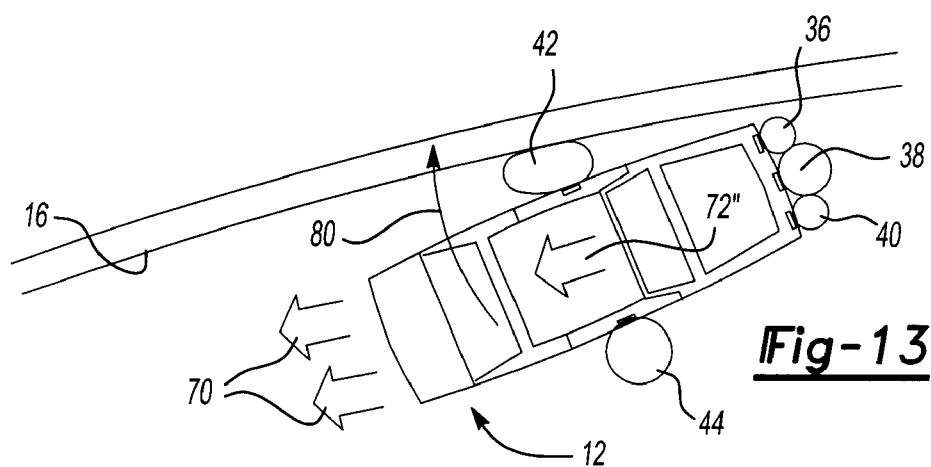
FIG. 13 illustrates a succeeding view to that shown in FIGS. 11 and 12 and in which the vehicle re-impacts the barrier from the side and when in a substantially reversed direction.

Referring to FIG. 11, a reverse and second eventuality of the impacting vehicle 12 is shown and in which the vehicle 12 continues in a reversing (see phantom designation 12") after impact with the wall 16. The reversing rotation is illustrated by directional arrow 80 in FIGS. 11, 12 and 13 and, referring again to the succeeding views of FIGS. 12 and 13, illustrate the vehicle 12 continuing to the position of FIG. 13 and in which the vehicle is located in substantially reversed direction relative to the wall barrier 16. Even in this eventuality, the system 10 of the present invention has accomplished its goal of absorbing a minority percentage of the wall impact forces (typically estimated to fall somewhere between 5% to 35%) depending upon the angle of inclination in which the vehicle impacts the wall, and concurrent with the remaining force being rotated and redirected along with the vehicle and to avoid such forces being substantially transferred to the driver. The illustration of FIG. 11 also shows the front edge external air bag 40" deflecting against the wall 16 during rotating of the vehicle 12" there against. The views of FIGS. 12 and 13 illustrate, in succession, the rotating and redirecting effect of the front air bags 36, 38 and 40 (including the larger sizing of the central and second bag 38) and the succeeding rotation and redirecting effect caused by the side bags (in this case side bag 42).

Figure 14:
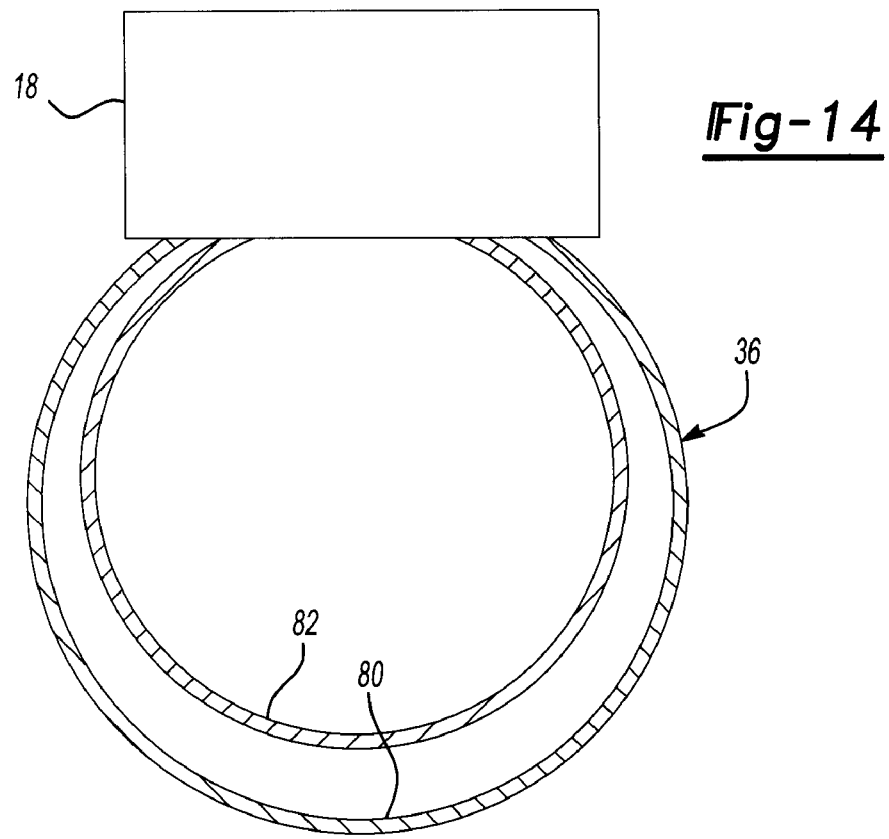
FIG. 14 is a sectional view of an individual air bag actuating unit, such as is also illustrated in FIG. 4, and illustrating in cutaway nature the dual stage nature of the actuated bag with inner and outer layers.

Referring to FIG. 14, a selected and externally actuated bag (see air bag 36 for first actuating unit 18) is illustrated in cutaway fashion and which, in a further preferred variant, shows a dual layer construction with a first external layer 80 and a second inner and concentric layer 82. The construction of the bag assembly and the manner in which the dual layers are deployed provides an increased degree of resiliency to the assembly. Specifically, sharp metal edges and the like often exist in car racing environments and the ability to provide a dual layer bag increases its effectiveness in the event that the outer layer becomes pierced. Also, the severity of the vehicle impact may also affect the integrity of a single walled air bag construction and the provision of the inner and outer layers provide a further measure of resiliency. As previously described, the air bags can each be constructed of a heavy duty nylon or like material and it is further contemplated that additional and suitable materials, such as steel mesh screening mixed with other suitable flexible and substantially air tight composites may be employed to provide the requisite degree of strength and impact-resistance.

Referring again to FIG. 4, an additional variant of the present invention provides the driver with the option of instantly deflating the air bags in the event of a sufficiently non-disabling collision and in the desire to continue in the race. In this instance, the driver engages a switch (not shown) within the vehicle with in turn instructs the introduction of a suitable gas charge (see carbon dioxide designation 84) which will result in each air bag being immediately deflated.

Figure 15:
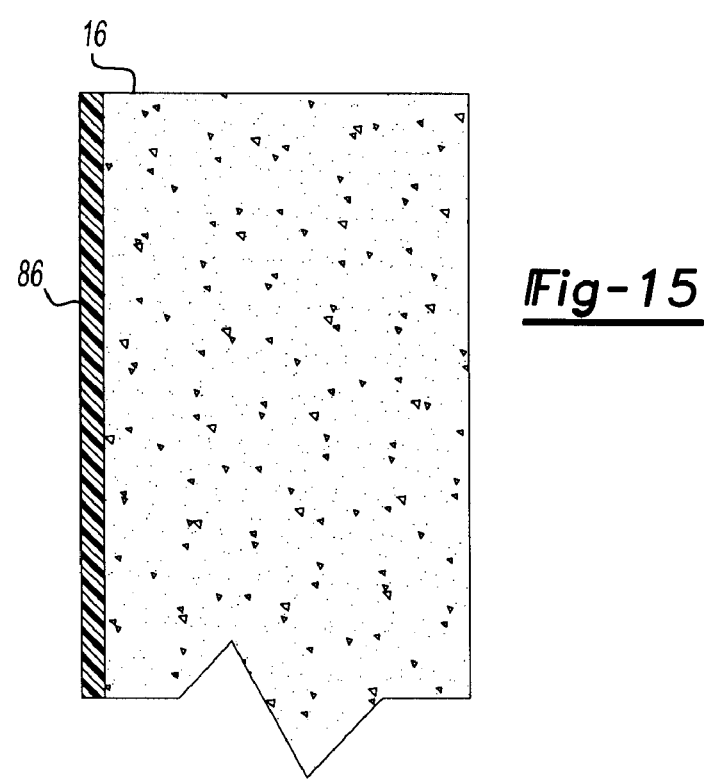
FIG. 15 is cutaway side illustration of the barrier wall and further showing the frictional reducing surface coating applied to the concrete substratum.

Referring finally to FIG. 15, a cutaway view is illustrated of the concrete barrier 16 and in which a suitable covering material 86, such as a substantially frictionless surface coating, is applied and in order to facilitate the rotational and redirecting forces of the vehicle. The covering material 86 is typically provided prior to application of the target strip 68 and its composition may include a durable nylon or epoxy coating.

Although not illustrated, an alternate variant of the present invention contemplates reversing the arrangement disclosed above and in which an appropriate target strip may be placed along the vehicle. Air bag actuating units are in turn mounted at specified locations along the inwardly facing barrier surface of the race track and are communicated with an appropriate processor and memory chip construction communicable with the actuating units. Upon the vehicle traveling in a specified orientation, speed and distance relative to the wall, a given plurality of the units may be deployed to engage their associated bags. Although not perceived as efficient as providing the actuating units upon the vehicle itself, and given the very large size of some race tracks, the reversal of the bags and target strip according to the arrangement could be successful to some degree, in particular if the bags are limited to applications along the track corners and directly adjacent straight away portions which are determined to be the most likely sites of such impacting collisions.

As further previously described, the system according to the present invention is effective in even situations where head on collisions with the wall barrier occur and where the rotational and redirecting effect is not achieved. In such instances, the sizing of the central front bag (38) relative to the remaining front bags 36 and 40 will cause successive deforming impact of the central bag 38, front peripheral bags 36 and 40, and front vehicle bumper 26 and in an attempt to ameliorate, to the extent possible, the impact forces of the collision.

It is also contemplated that the system of the present invention can be incorporated into applications outside of auto racing and which may include commercial and passenger vehicles and trucks. In these environments, such potential barriers or objects may include trees, bridge piers, abutments, guardrail end sections, farm machinery, deer and other large animals such as horses and cows. Components of the system, such as the airbag cartridges, can be incorporated into grill and headlight, tail light and bumper assemblies of automobiles and trucks sold in the United States, and in particular those sold since 1980. A further such commercial application would contemplate the activator mechanisms triggering upon the vehicle closing on an acquired target, as previously described, at closing speeds in excess of 20 mph. It is also within the scope of the invention to modify the emitter/receiver units to not require the provision of the reflective target strip and in view of the particular application.

In racing applications, it has also been determined that the present system offers the potential of reducing the imposed horse power restrictions currently in effect by NASCAR and thereby release the potential of the individual cars and drivers. This has the further effect of spreading out the race field further contributing to the safety and excitement of the event, it being understood that restrictions that cause the cars to operate in similar fashion cause unsafe groupings of the vehicles on the track and increasing the incidence of accidents.

Having described my invention, additional preferred embodiments will become apparent to those skilled in the art to which it pertains, and without deviating from the scope of the appended claims.

I claim:

1. An energy absorption, rotation and redirection system for use with a vehicle traveling astride a barrier, the vehicle having a front end with a bumper and first and second sides, the barrier including a substantially vertically extending and unmovable surface, said system comprising:

a plurality of air bag actuating units mounted at specified locations along the front end and first and second sides of the vehicle, and an activator mechanism associated with at least one of said actuating units for selectively instructing the inflation of an exterior air bag associated with said bag actuating unit;

whereupon the front end of the vehicle facing the barrier within a selected distance, said activator mechanism engaging said external air bags and prior to the vehicle striking the barrier, the vehicle subsequently rotating and redirecting concurrent with the barrier absorbing a determined percentage of force associated with the contact.

2. The system as described in claim 1, the barrier further including a concrete wall having a substantially vertically extending surface, the activator mechanism further comprising:

a target strip applied in extending fashion along the concrete wall and approximately at grill height of each vehicle;

an internal and computerized processor mounted within the vehicle, said processor including a memory chip;

each of said forwardly located air bag actuating units further comprising a laser emitter/receptor operatively connected to said computer processor and memory chip;

each of said emitter/receptors issuing a lasing pattern which, upon the vehicle achieving a specified orientation relative to the concrete wall, is reflected off of said target strip and back to at least one of said emitter/receptors; and said processor and memory chip, upon identifying a closing distance, angle and/or speed of the vehicle relative to the concrete wall as communicated by said at least one emitter/receptor, instructing the actuation of said air bag units and prior to the vehicle contacting the wall.

3. The system as described in claim 1, further comprising a plurality of first, second and third air bag actuating units positioned at spaced intervals along the bumper, a fourth air bag actuating unit being located within a door associated with the first side of the vehicle and a fifth air bag actuating unit being located within a door associated with a second side of the vehicle.

4. The system as described in claim 3, each of said air bag actuating units being recessed a given distance within the associated front and sides of the vehicle.

5. The system as described in claim 4, each of said air bag actuating units further comprising a removable/replaceable cartridge which is installed within an associated pocket defined within the front and sides of the vehicle.

6. The system as described in claim 3, an exteriorly inflatable air bag associated with each of said air bag actuating units further comprising a substantially three dimensional and spherical shape.

7. The system as described in claim 6, an air bag associated with said second actuating unit being positioned between bags associated with said first and third actuating units, said second air bag having a size larger than said first and third bags and in order to encourage said force absorption, rotation and redirecting motion of the vehicle.

8. The system as described in claim 7, said fourth and fifth air bag actuating units being positioned at locations front of center of the vehicle, air bags associated with said fourth and fifth actuating units having a further specified size which, upon side impact of the vehicle against the barrier, further encourages force absorption, rotation and redirecting motion of the vehicle.

9. The system as described in claim 6, each of said air bags further comprising a reinforced nylon material.

10. The system as described in claim 6, each of said exteriorly inflatable air bags further comprising a dual layer construction with an exterior layer and an interior and substantially concentric inner layer.

11. The system as described in claim 2, further comprising a substantially frictionless surface coating applied upon an inwardly facing surface of the concrete barrier in cooperation with said target strip.

12. The system as described in claim 8, further comprising each of said air bags having a specified shape and size which, when fully actuated, does not substantially impair a vehicle operator's field of vision.

13. The system as described in claim 8, further comprising deflating means for permitting a vehicle operator to deflate said air bags.

14. The system as described in claim 13, said deflating means further comprising an operator engageable switch for feeding a carbon dioxide charge to each of said inflated bags.

15. The system as described in claim 2, said target strip further being comprised of a highly reflective material.

16. An energy absorption, rotation and redirection system for use with a vehicle having a front end with a bumper and first and second sides, said system comprising:

a plurality of air bag actuating units mounted at specified locations along the front end and first and second sides of the vehicle, and an activator mechanism associated with at least one of said actuating units for selectively instructing the inflation of an exterior air bag associated with said bag actuating unit; and whereupon the vehicle approaching any object that impedes, alters, restricts or blocks the speed, force or direction of the vehicle, said activator mechanism engaging said external air bags so that, upon striking the object, the vehicle subsequently rotating and redirecting concurrent with the object absorbing a determined percentage of force associated with the contact.

17. An energy absorption, rotation and redirection system for use with a racing vehicle traveling astride a concrete wall barrier, the vehicle including a front end with a bumper and first and second sides, said system comprising:

a plurality of air bag actuating units mounted at specified locations along the front end and first and second sides of the vehicle, and an activator mechanism associated with at least one of said actuating units for selectively instructing the inflation of an exterior air bag associated with said bag actuating unit, said activator mechanism including a reflective target strip applied along the concrete barrier;

said activator mechanism further including laser emitter/receptor units associated with selected locations of the vehicle, a computerized processor and memory chip instructing the issuance of a lasing pattern from each of said emitter/receptor units and, upon at least one of said emitter/receptor units receiving a reflection from said target strip associated with a given orientation of the vehicle relative to the concrete wall barrier, directs deployment of said external air bags and prior to the vehicle striking the barrier, the vehicle subsequently rotating and redirecting concurrent with the barrier absorbing a determined percentage of force associated with the contact.

* * * * *